July 28, 1931.   A. B. JOHNSON   1,816,485
SAWING AND RESAWING MACHINE
Filed July 20, 1929   8 Sheets-Sheet 8

Inventor
Arthur B. Johnson
By his Attorneys

Patented July 28, 1931

1,816,485

UNITED STATES PATENT OFFICE

ARTHUR B. JOHNSON, OF MINNEAPOLIS, MINNESOTA

SAWING AND RESAWING MACHINE

Application filed July 20, 1929. Serial No. 379,676.

My present invention relates to machines for first sawing sheets of insulating material, composition board, and the like into a plurality of strips and then sawing the strips each into a plurality of sections. For accomplishing this result two sawing machines are employed, arranged to feed and saw on lines at right angles. A great deal of difficulty has been experienced in properly transferring the sawed strips from the first machine to the second sawing machine, which is arranged to feed and saw the strips transversely or at right angles. This invention is directed chiefly to improved transfer mechanism and to the novel arrangement thereof in respect to the two sawing machines. In carrying out my invention, I preferably use two sawing machines of the character disclosed and claimed in my co-pending application, Serial Number 369,613, filed June 10, 1929, Patent No. 1,802,514 and entitled "Sawing machines"; but it will be understood that this transfer mechanism may be used in connection with other modified forms of the two sawing machines proper.

The accompanying drawings illustrate the commercial machine embodying my present invention and arranged to saw sheets of material first into a plurality of strips and then to saw the strips into a plurality of lengths.

Referring to the drawings.

The two sawing machines, herein referred to as being preferably of the type disclosed in my above identified pending application, are herein designated as entireties, the one for sawing the sheets into strips by the letter A, and the one for sawing the strips into shorter lengths by the letter B. These two machines are of like structure. The description of one thereof will answer also for the description of the other and inasmuch as the said machines are more clearly and fully described in my co-pending application, only the more important parts of the said machine will be herein particularly described as follows:

The frame of each machine illustrated comprises cast side plates 10, upper and lower crossties 11, and a feed deck made up of a plurality of laterally spaced skids or rails 12 that are rigidly supported by the main frame. An arbor beam supports the brackets 13, which are rigidy secured to, and extend upward from, the side plates 10 of the main frame. These brackets have opposing edges spaced so as to afford vertical guides for outer end arbor bearing blocks 14. The bearing blocks 14 support a heavy transverse arbor supporting beam 16, one end of which projects to afford a motor support, to which the frame of an electric motor 17 is rigidly hung. The saw arbor, which is in the form of a long heavy shaft 18, is mounted in the bearing blocks 14 preferably by means of anti-friction bearings. Saw arbor 18 is provided with laterally spaced circle saws 19 which, as is customary, are axially adjustable thereon by well known means, and which saws may be applied in any desired number or in any desired spacing.

Figure 3:
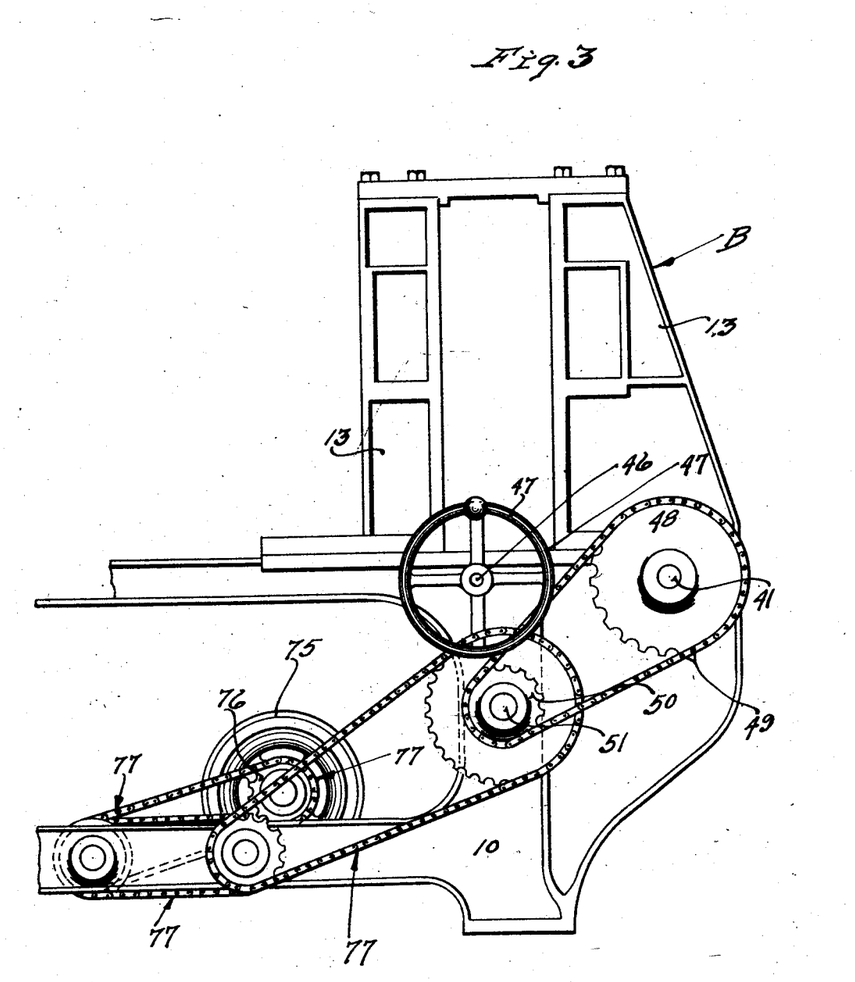
Fig. 3 is a view in front elevation showing portions of the machine found in the vicinity of the line mark 3—3 on Fig 1.

The means for feeding the sheet of material, such as the sheet Y, include feed chains 38 each chain being equipped with a driving lug 39, and arranged to run over sprockets 40. The sprockets 40 at the front or delivery end of the machine are carried by shafts 41, journaled in suitable bearings on the side plates 10. The lugs of these chains cause the sheets or strips of material to slide along on the upper surfaces of the skids 12 to and past the lower edge portions of the saws. The skids 12 are fixed and hence to adjust the saws vertically in respect to the material to be sawed, the arbor supporting beam 16 and parts hung therefrom is arranged for vertical adjustment. For this purpose the vertical movable bearing blocks 14 are provided with depending screw threaded stems 42 (see Fig. 6) that work without threaded engagement through lugs 43, and through flanges on the plates 10. Nut acting worm gears 44 work with threaded engagement on the stems 42 and rest on the lugs 43. The two worm gears 44 mesh with worms 45 on the cross shafts 46, journaled in suitable bearings on the side plate 10, and provided at its outer end with a hand piece in the form of a wheel 47 (see Figs. 1, 3, and 4). The parts so far described are designated by the same characters that are found on corresponding parts in my above identified co-pending application.

As already made clear the saw arbors of the two machines A and B are driven independently of each other and of cooperating feed mechanism, and each by its own individual motor 17. The feed means may be driven in any suitable way so far as the present invention is concerned but, as shown, the sprocket shafts 41 of the two machines are provided with sprocket wheels 48. Sprocket chains 49 run over the sprockets 48 and over sprockets 50, on a transverse shaft 51, journaled in the side plates 10 of the respective machines A and B. The shafts 51 of the two machines A and B are in the same horizontal plane but at right angles one to the other and they are coupled together so that the feed chains of the two machines A and B will be driven in a properly timed relation one in respect to the other as will appear further in the description of the operation.

Figure 2:
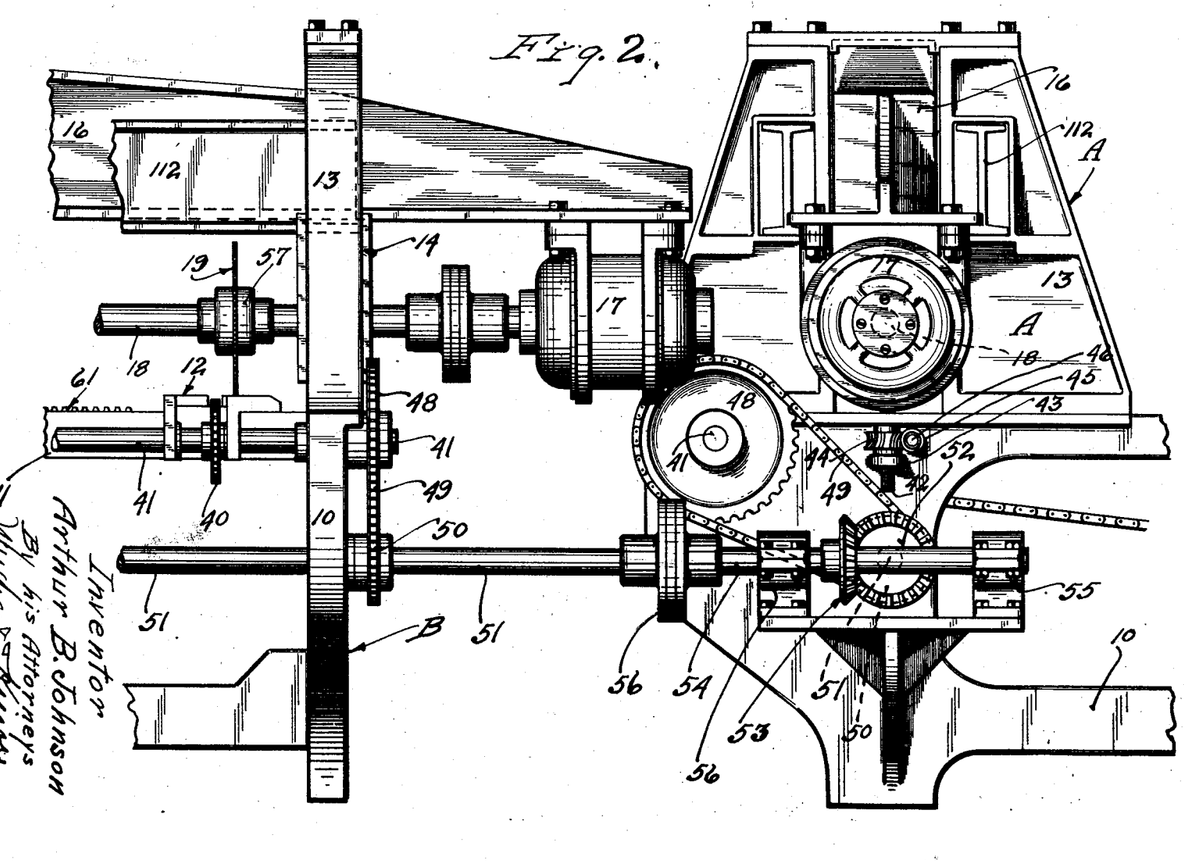
Fig. 2 is a left-side elevation showing portions of the complete machine found in the vicinity of the line mark 2—2 on Fig. 1.

While the feed mechanism may vary greatly, the timed relation of the two feeding devices is highly important. The means for coupling the two shafts 51 is best illustrated in Fig. 2, by reference to which it will be noted that the shaft 51 of the machine A is provided with a miter 52 that meshes with the miter gear 53, carried by a short shaft 54, journaled in suitable bearings 55 on the adjacent side frame 10. This shaft 54 is axially aligned with and connected to shaft 51 of machine B by a coupling 56 as best shown in Fig. 2.

Figure 5:
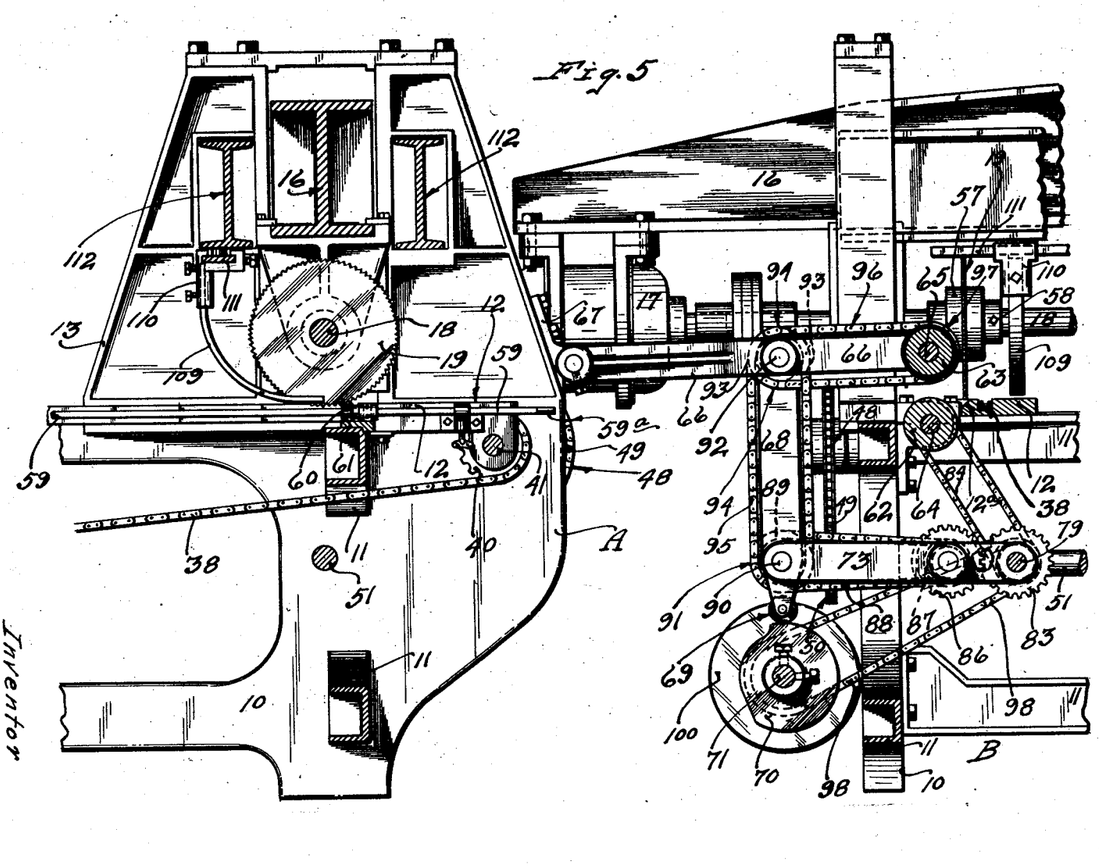
Fig. 5 is a vertical section taken approximately on the line 5—5 of Fig. 1.

It has already been stated that the saws are mounted for axial or lateral adjustments on their arbors 18. This may be accomplished by many suitable means, such as saw clamping collars 57 provided with set screws 58 and engaged in respective arbors, as best shown in Fig. 5. The skids 12 are also mounted for lateral adjustments to properly position the same in respect to the saws and as best shown in Fig. 5. These skids are provided with grooves in which the upper portions of the feed chains 38 are arranged to run with their lugs 39 only projecting above said skids. Also, it will be noted by reference to Fig. 5 that the skids 12 are beveled at 12a on their edges towards which the material Y is fed from the machine A to the machine B. Lateral adjustments of the said skids may be accomplished in different ways, but, as shown, each skid is provided with a longitudinally extended shaft 59 journaled thereto and provided with small pinions 60 that engage transverse racks 61 secured on the cross member 11 of the main frame, see particularly Figs. 1 and 5. By reference to the latter view, it will be noted that the shafts 59 at their forward ends are made angular at 59a for the application of a suitable wrench or operating crank.

Transfer mechanism

Figure 1:
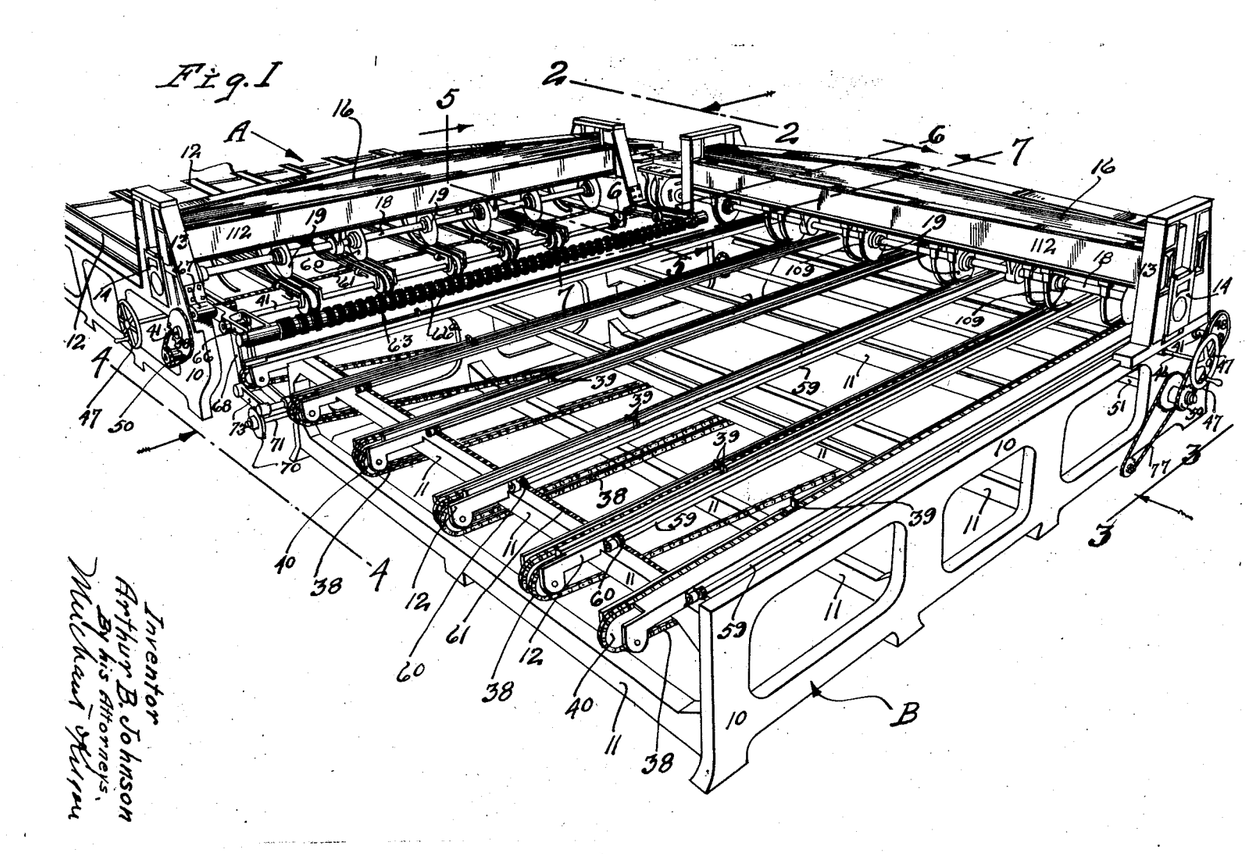
Fig. 1 is a perspective view showing the complete machine embodying two sawing machines proper, co-operatively associated with the improved transfer mechanism, arranged to function as above stated.
Figure 4:
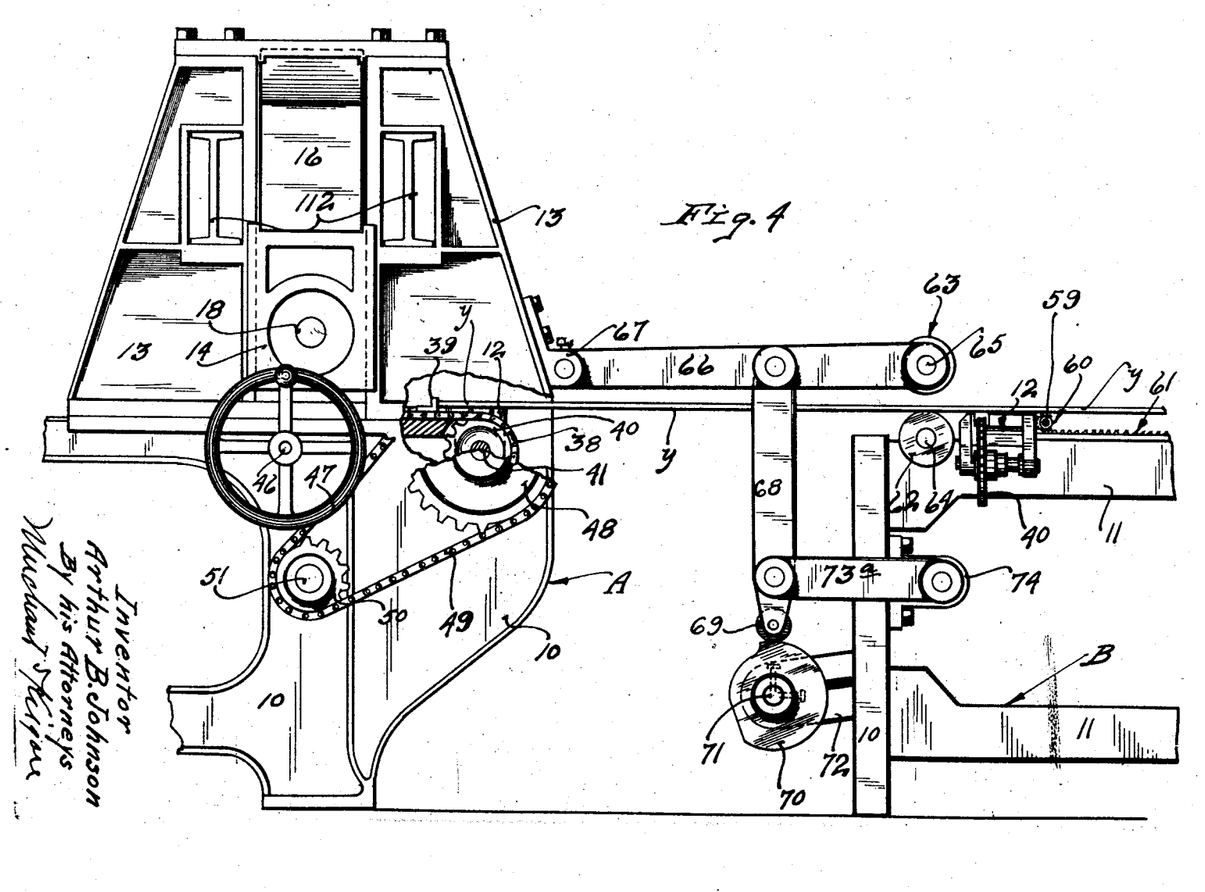
Fig. 4 is a right-side elevation showing portions of the machine found in the vicinity of the line mark 4—4 on Fig. 1.

For this mechanism, attention is directed first to Figs. 1, 4, and 5. As the sheet of material Y is fed from the machine A and cut into strips, it will be projected from the skids of said machine A between co-operating lower and upper transverse rollers 62 and 63. Lower roller 62 is on a shaft 64 that is journaled in suitable fixed bearings on the frame of machine B. The roller 63 is on the shaft 65 that is journaled in free ends of pairs of laterally spaced arms 66 that are pivoted to brackets 67 on the frame brackets 13 of the machine A. The arms 66 are supported for vertical movements by pivotally attached depending lift legs 68, which at their lower ends are equipped with rollers 69 that ride on cams 70 that are carried by a transverse cam shaft 71 that is journaled in suitable bearings 72 on the frame of machine B. Links 73 and 73a are pivotally connected to legs 68 and to suitable bearings on the main frame of machine B. Link 73a is pivotally connected to a lug 74 on machine B while link 73 at the opposite side of the machine is pivotally connected on a shaft to be hereinafter described. The links 73 and 73a hold legs 68 to vertical movement and cause the same to properly ride on the co-operating cams. The form of cam 70 is best shown in Figs. 4 and 5.

Figure 6:
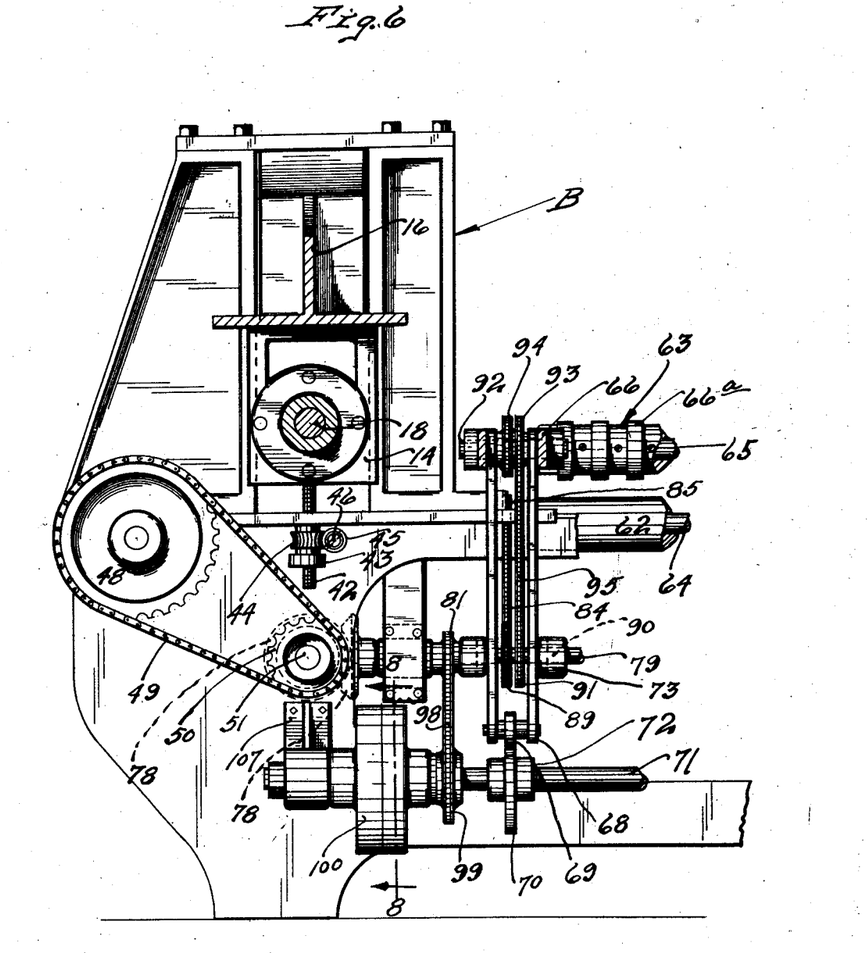
Fig. 6 is a transverse vertical section taken approximately on the line 6—6 of Fig. 1.

By reference to Figs. 1 and 6, it will be noted that the arms 66 are bifurcated at their outer ends so as to afford bearings for shaft 65. By reference to the same views, it will be noted that the lift legs 68 are bifurcated or two part structures, that is, each is made up of a pair of laterally spaced metal strips or members, which construction, however, while desirable, may be greatly modified.

The feeding mechanism of the machines A and B and the movable parts of the transfer mechanism are driven from a common electric motor 75 shown as mounted on the frame of machine B. The rotor of this motor 75 carries a sprocket wheel 76 that drives the shaft 51 of machine B through a reducing train of sprockets and chains indicated as an entirety by the numeral 77, best shown in Fig. 3. It will be remembered that shafts 51 of the two machines A and B are, by the mechanism best illustrated in Fig. 2, connected for reduction in synchronizing and hence it follows, of course, that when the shaft 51 of machine B is driven, the shaft 51 of machine A will also, through connections already described, be driven from the motor 75.

Figure 7:
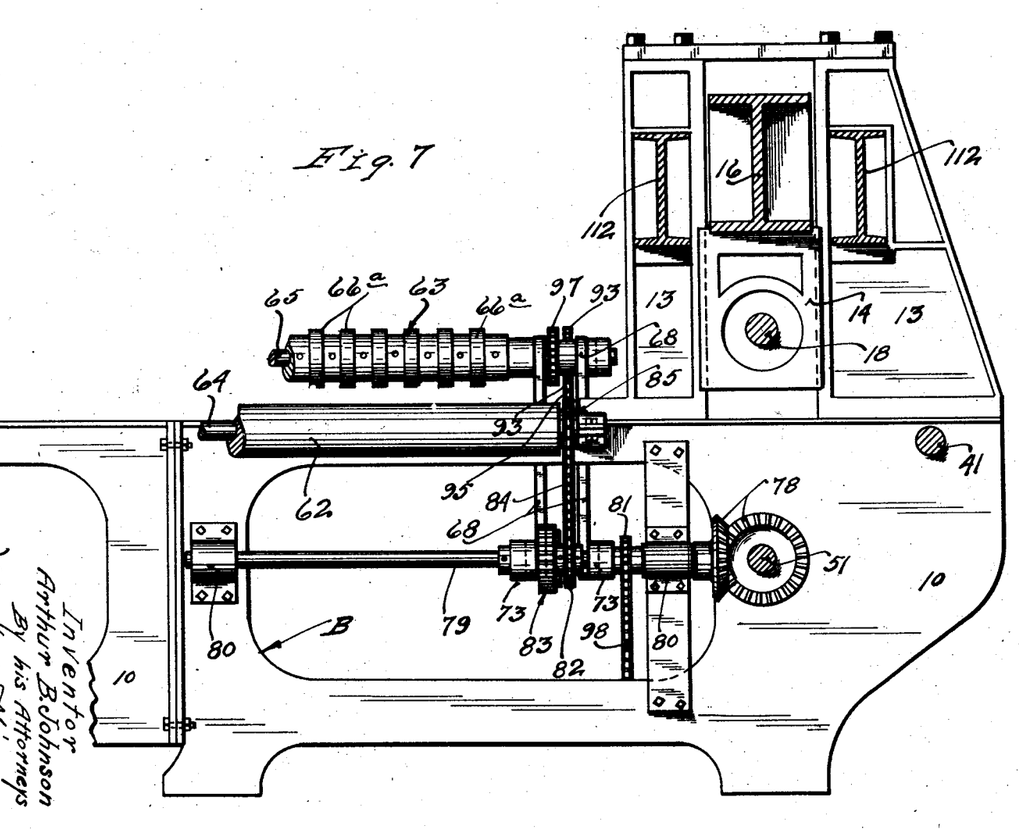
Fig. 7 is a transverse vertical section taken approximately on the line 7—7 of Fig. 1, some parts being shown only in diagram and some parts being removed.
Figure 8:
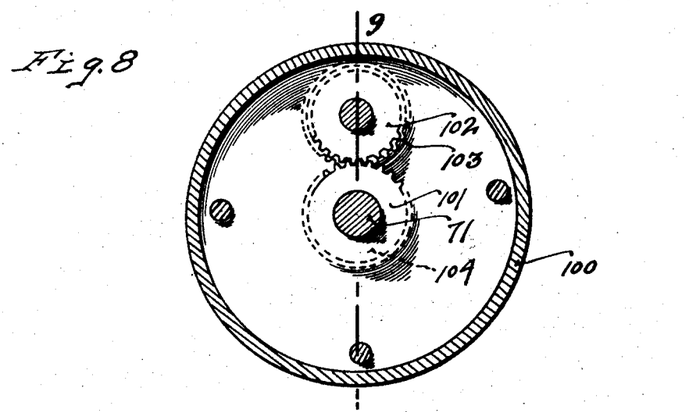
Fig. 8 is a fragmentary detail in section taken on the line 8—8 of Fig. 6.
Figure 9:
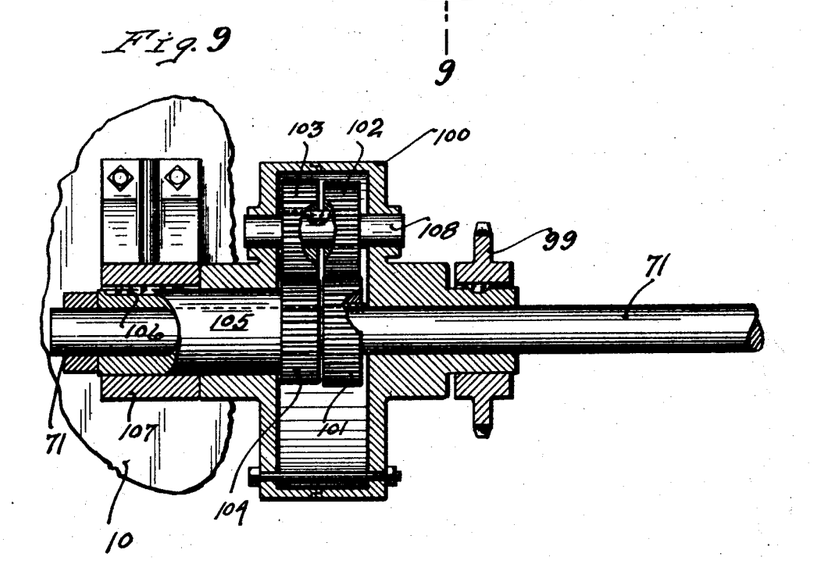
Fig. 9 is a section taken on the line 9—9 of Fig. 8.

By reference particularly to Figs. 6 and 7, it will be seen that shaft 51 of machine B is connected by miter gears 78 to a counter shaft 79, journaled in suitable bearings 80 on the frame of machine B. Here it should be noted that link 73, above described, is pivoted on shaft 79. This counter shaft 79 carries sprockets 81 and 82 and a spur gear 83. The sprocket chain 84 runs over the sprocket 82 and over a sprocket 85 on one end of shaft 64, and the transfer gear 83 meshes with a similar gear 86 that is journaled to link 73 intermediate the ends thereof.

Gear 86 carries a sprocket 87 (indicated by dotted lines in Fig. 5) that drives a sprocket chain 88, that runs over a sprocket 89, that is loose on a pivot pin 90 that constitutes the pivotal connection between the adjacent lifting leg 68 and co-operating leg 73. A sprocket 91 is connected to rotate with sprocket 89. A pivot pin 92 affords a connection between the upper end of a lifting leg 68, shown in Fig. 5, and the co-operating arm 66 and on this pivot pin are journaled two sprockets 93 and 94. A sprocket chain 95 runs over the sprockets 91 and 93. A sprocket chain 96 runs over the sprockets 94 and 97 on the shaft 65 of upper transfer roller 63. The driving connections above described permit raising and lowering movements of the upper roller 63 while driving the same. The timing of raising and lowering movements of said upper transfer roller 63, in respect to other moving parts of the feed mechanism, will be noted in the description of the operation of the complete machine.

The lifting cam 70 controls the raising and lowering movements of the upper transfer roller 63 and is operated with a very slow movement in respect to the movements of the rollers and other running parts, for instance, in the machine illustrated the cam shaft is driven from the counter shaft 79 with a speed reduction of 40 to 1 (see Figs. 6, 7, 8, and 9). A sprocket chain 98 runs over the sprocket 81 on counter shaft 79, over a sprocket 99, that is indirectly journaled on shaft 71. This sprocket 99 is keyed on the hub of a gear casing 100 that is rotatively mounted on cam shaft 71. Within the gear casing 100 is a closely assembled group of four spur gears 101, 102, 103, and 104. Gear 101 is keyed to cam shaft 71 while gear 104, which is a non-rotary gear, is loose on shaft 71 and secured to a sleeve 105. Sleeve 105 is anchored by a key 106 or other suitable means to a fixed bearing 107 secured on one of the frame members of machine B. As shown, shaft 71 is extended through a journal in sleeve 105. The gear casing 100 is journaled both on shaft 71 and on sleeve 105. The two gears 102 and 103, which are connected for common rotation are shown as keyed to a short shaft 108, located eccentric to shaft 71 and journaled in gear casing 100. Gear 102 meshes with gear 101, and gear 103 meshes with gear 104. In this particular arrangement gear 104 has 39 teeth, and gear 101 has 40 teeth. Sprocket 99 has twice the diameter of sprocket 81 so that there is a reduction of 2 to 1 in speed between counter shaft 79 and the housing 100. When housing 100 is rotated, shaft 71 will be driven from sprocket 99 at a reduced speed of 20 to 1 so that shaft 71 thereby is indirectly driven from counter shaft 79 at a reduced speed of 40 to 1. The above reduction of 20 to 1 in the transmission and through the gears within the rotary casing 101, is due to the following facts: Inasmuch as gears 103 and 104 have the same number of teeth, it is evident that rotation of gear 103 around gear 104 in itself would not produce any differential in speed between the cam shaft 71 and the short shaft 108, but inasmuch as gear 102 has two teeth less than gear 101, it follows that equal rotation of gear 102 around gear 101 there will be a differential of movement equal to two teeth or $\frac{1}{20}$ of the total of the teeth of driving gear 101, and cam 70 will be driven in a clockwise direction in respect to Fig. 4 at the reduced speed stated.

Summary of operation

To hold the sheet of material down on the skids 12 while passing the saws, yielding pressure devices are desirable and in the machine illustrated, these are afforded by curved spring hold down arms 109 that are adjustably secured to the brackets 110, slidably mounted on rails 111 secured to transverse beams 112 that are extended between and secured to the frame brackets 13 of machines A and B. The wide sheet or slab of material to be sawed, for example, the wide sheet of insulating material, say 8 or 10 feet wide and 8 or 10 feet long more or less, will be placed on the skids 12 of machine A and by the lugs 39 of the feed chains 38, will be fed over said skids to the saws of machine A. Said saws, of course, are spaced to cut the sheets into strips of desired width. As the sawed strips are projected from machine A they will be held down onto the skids 12 of machine A by the spring arms 109 and will be projected between the transfer rollers 62 and 63 (see Figs. 4 and 5), while the latter is held in a raised position by the action of cams 70 on rollers 69 of lift legs 68. Here it may be stated that roller 62 is preferably a smooth metal roller, while roller 63 is preferably a metal roller provided with axially spaced rubber collars 66a (see particularly Figs. 1, 5, and 6). Just before the lugs 39 of chains 38 of machine A go out of driving contact with the rear edge of material Y cams 70 drop legs 68 and arms 66 and cause the roller 63 to come down into engagement with the sawed strips from machine A. This brings the rollers 62 and 63 into frictional driving contact with the sawed strips and thereafter the movement of the sawed strips onto and transversely of the skids 12 of machine B will be controlled by these transfer rollers 62 and 63.

Attention is here called to the important fact that the driving speed of roller 62 is faster or greater than the driving speed of chains 38 of machine A and this accelerated speed carries the rear edges or ends of the sawed strips away from the driving lugs 39 of chains 38 of machine A, just before the time that the said lugs make their downward return movement. In practice I have found that in feed mechanism wherein the lugs of the feed chains leave contact with the material being fed by downward scraping action, the rear edges of such material will be split or damaged by the scraping action resulting from the downward frictional scraping action produced and affecting the final disengagement.

The transfer rollers 62 and 63 are so located that they discharge the sawed strips of material Y transversely of the skids 12 of machine B and in proper position to be taken by the lugs 39 of chains 38 of said machine B and to be properly delivered to the saws of machine B and thereby cut into the desired lengths. Of course, the saws of machine B will be properly spaced to cut the strips into the desired lengths. The timing of the chains of machine B are such that their lugs 39 will engage the rear strip of material Y just after the strips have been properly positioned on the skids 12 of machine B. Immediately after the strips are discharged from between the transfer rollers 62 and 63, cams 70 acting through rollers 69, lugs 68 and arms 66 will raise roller 63 and will hold the same in its raised position until another sheet of material Y is delivered from machine A in the manner already described. The rapidity with which large sheets of insulating material or the like may be sawed first into strips and finally into relatively small rectangular sections is thought to be obvious from the foregoing description. The machine has been found useful for many purposes. One of its main uses has been to saw large sheets of insulating material into small sections for use in the building of refrigerators.

It would be quite proper to designate machine A as a sawing machine, and machine B as a re-sawing machine. The transfer mechanism herein employed positively feeds the sawed strips from the sawing machine and accurately positions the same on the skids of the re-sawing machine. This transfer, moreover, is accomplished by a feeding action that simply lets go of the strips allowing them to remain properly positioned on the skids of the re-sawing machine. This type of transfer has been found very much more satisfactory than such means for example that would kick or eject the material with a catapulting action. Moreover, with this improved transfer mechanism it is perfectly feasible to locate the two machines far enough apart so that a workman may walk between the machines for making repairs, adjustments, or for greasing and the like.

What I claim is:

1. The combination with a sawing machine having feeding means and a plurality of saws, a re-sawing machine having feeding means and a plurality of saws, the re-sawing machine being arranged to receive from the sawing machine and to feed the material transversely of the line of feed of said sawing machine, of transfer mechanism including opposed normally separated feed rollers, one of said rollers being movable in respect to the other thereof, means operative to drive and close said rollers onto the material properly timed to move the material from said sawing machine onto the feed mechanism of said re-sawing machine, the feed mechanism of said sawing machine including endless conveyors with driving lugs and the transfer rollers being arranged to be started into action on the material just before said material is released from the lugs of said feed means and at a speed that accelerates the movement of material being transferred and thereby carry said material out of engagement with the lugs of said feed chains as said lugs make their downward initial return movement.

2. In a sawing machine, the combination with a saw and an endless lug-equipped feed chain arranged to feed material to and past the saw, of mechanism for continuing feeding movement of material beyond the feed chain, and in line therewith, including opposed intermittently operative feed rollers arranged to receive material as it is delivered from the feed chain and to become operative thereon just before a drive lug of the feed chain comes to the end of its driving movement and at a speed that accelerates speed of movement of the material and moves the same out of engagement with the drive lug before said lug makes its downward initial return movement.

3. In combination with an endless driving lug-equipped feed chain, mechanism operative to continue feeding movements of material beyond the feed chain, and in line therewith, including opposed intermittently operative feed rollers arranged to receive material from the feed chain and to become operative thereon just before a driving lug of the feed chain comes to the end of its driving movements and at a speed that accelerates movement of the material and move the same out of engagement with the drive lug before said drive lug makes its downward initial return movement.

In testimony whereof I affix my signature.

ARTHUR B. JOHNSON.